US006284994B1

(12) United States Patent
Cross

(10) Patent No.: US 6,284,994 B1
(45) Date of Patent: Sep. 4, 2001

(54) ELECTRODE SYSTEM FOR PERFORATING SYNTHETIC PLASTIC FILMS

(76) Inventor: James D. Cross, 41 Allen Street East, Waterloo, Ontario (CA), N2J 1J1

( * ) Notice: Subject to any disclaimer, the term of this patent is extended or adjusted under 35 U.S.C. 154(b) by 0 days.

(21) Appl. No.: 09/449,546

(22) Filed: Nov. 29, 1999

(51) Int. Cl.[7] .............................. H05B 7/18; B23H 1/08

(52) U.S. Cl. ....................... 219/69.1; 219/69.14; 219/68; 219/384

(58) Field of Search .................................. 219/68, 69.14, 219/69.1, 383, 384

(56) References Cited

U.S. PATENT DOCUMENTS 2,141,869 * 12/1938 Konig .
2,495,534 * 1/1950 Meaker .
2,763,759 * 9/1956 Mito et al. .
3,502,845 * 3/1970 Schirmer .
3,862,396 * 1/1975 Machinda et al. ................... 219/384
4,278,871 * 7/1981 Schmidt-Kufeke et al. ........ 219/384
4,314,142 * 2/1982 Brown et al. ........................ 219/384
4,777,338 * 10/1988 Cross ................................ 219/69 R
5,356,497 * 10/1994 Lee ........................................ 156/87
5,415,538 * 5/1995 Kagawa ........................... 425/174.4

* cited by examiner

*Primary Examiner*—Tom Dunn
*Assistant Examiner*—Colleen P. Cooke
(74) *Attorney, Agent, or Firm*—Ridout & Maybee

(57) ABSTRACT

An apparatus for perforating a film has one or more electrodes in electrode holders to lightly contact the film, a return electrode to support the film, and a voltage coupler to produce a discharge between the electrodes to perforate the film. A water jet sprayer is mounted on an electrode holder to provide a jet of water where the electrodes come into contact with the film.

11 Claims, 2 Drawing Sheets

ELECTRODE SYSTEM FOR PERFORATING SYNTHETIC PLASTIC FILMS

FIELD OF THE INVENTION

The present invention relates to the perforation of synthetic plastic films, and more particularly to an apparatus and method for perforating synthetic plastic films.

BACKGROUND OF THE INVENTION

In U.S. Pat. 4,777,338, the inventor in common to the subject invention describes a device for producing spark perforation of synthetic plastic films. The perforation is performed by applying electrodes to opposite sides of the film as the film is passed through a water bath. The apparatus disclosed in this patent has certain limitations when operated as a perforation machine on a commercial scale.

The limitations of the perforation device disclosed in U.S. Pat. No. 4,777,338 arise from the behaviour of the water bath. While the water bath makes it possible to produce closely spaced perforations in a synthetic plastic film, it has been found difficult to maintain uniform small hole diameters. This problem arises because the water bath can vary in electrical conductivity and the charge lost from the electrodes due to conductive leakage will also vary. Furthermore, charge leakage through the large amount of water surrounding the electrodes makes the perforation process inefficient, because rather large amounts of electrical pulse energy are needed to overcome the charge leakage. The high electrical pulse energy, in turn, causes the electrode rollers to wear rapidly as they are small and have a small contact area with the film. The wear on the rollers results in a wide contact band and erratic perforation of the film. Contamination in the water bath is also difficult to control because the water bath has no controlled flow pattern and as a result contaminants can accumulate in the region of the electrodes. Another shortcoming in the prior art apparatus is the marking of the film as it is pulled through bath pressed between the roller electrodes and the ground electrode (i.e. the bottom surface of the bath).

In view of the foregoing, there remains a need for a new perforation apparatus suitable for commercial use which overcomes the shortcomings of the prior device.

BRIEF SUMMARY OF THE INVENTION

The present invention provides a novel apparatus and method for perforating synthetic plastic films suitable for commercial application.

In one aspect, the present invention provides an apparatus for perforating a film, the apparatus comprises, one or more electrodes, said electrodes being mounted in an electrode holder and said electrodes being positioned to lightly contact the film to be perforated; a return electrode, the return electrode provides a support surface for the film; a water jet sprayer mounted in the electrode holder, and providing a jet of water in the location the electrodes contact the film; the electrodes including an electrical coupler for coupling to a high voltage supply for energizing the electrodes to produce a discharge between the electrodes and the return electrodes to perforate the film.

In another aspect, the present invention provides a method for perforating a synthetic film, said method comprising the steps of, moving the film to be perforated through a gap defined by one or more rod electrodes and a roller electrode, the rod electrodes being in light contact with the film and the film being supported by the roller electrode; applying high voltage pulses to the rod electrodes to cause a discharge between the rod electrodes and the roller electrode sufficient to perforate the film in an area where each of the rod electrodes contacts the film; simultaneously applying a jet spray of water to the region of contact between each of the rod electrodes and the film.

BRIEF DESCRIPTION OF THE DRAWINGS

Reference will now be made, by way of example, to the accompanying figures, which show a preferred embodiment of the present invention, and in which.

DETAILED DESCRIPTION OF THE PREFERRED EMBODIMENTS

Figure 1:
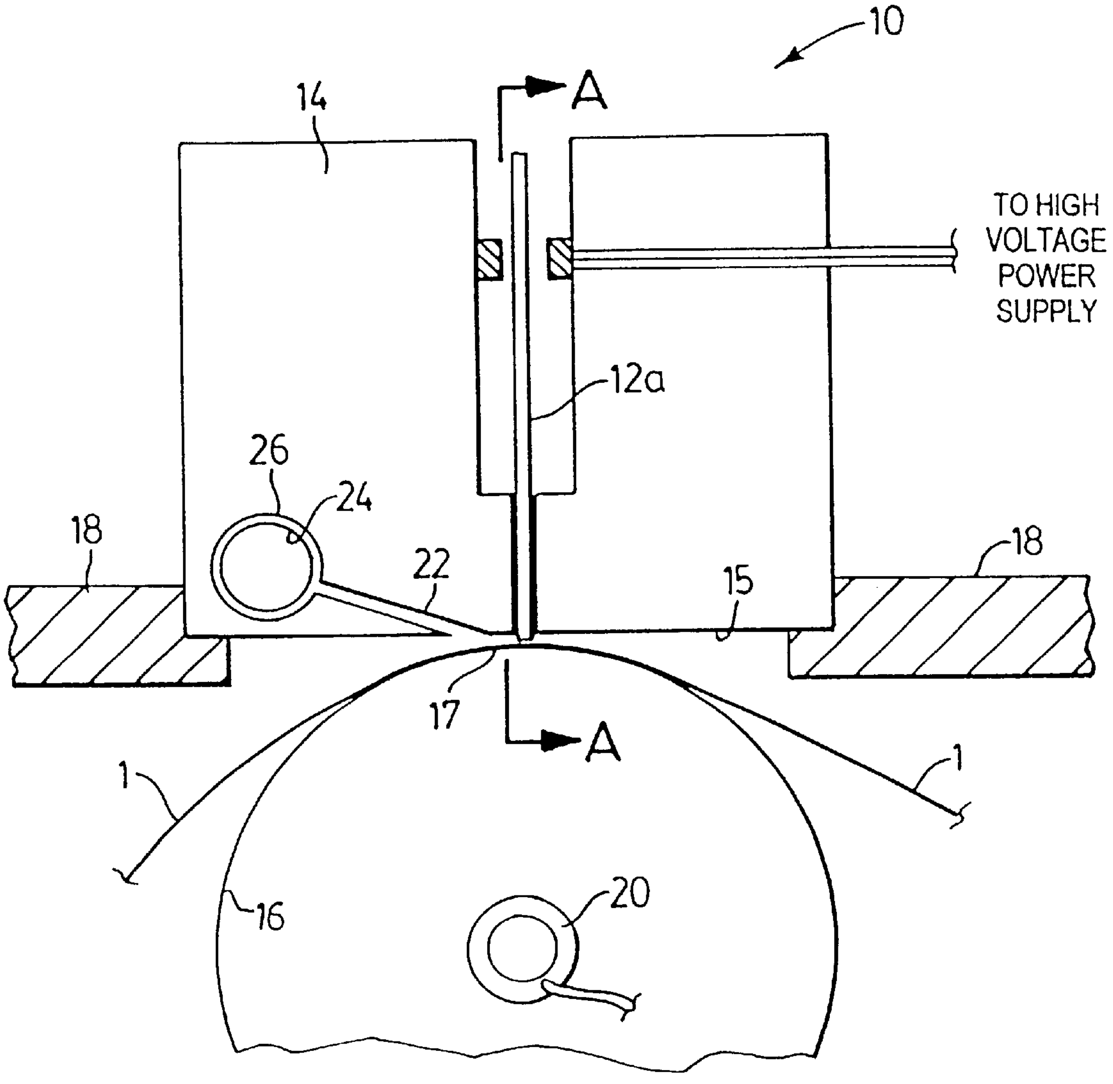
FIG. 1 is a schematic diagram of an apparatus for perforating synthetic plastic films according to the present invention.
Figure 2:
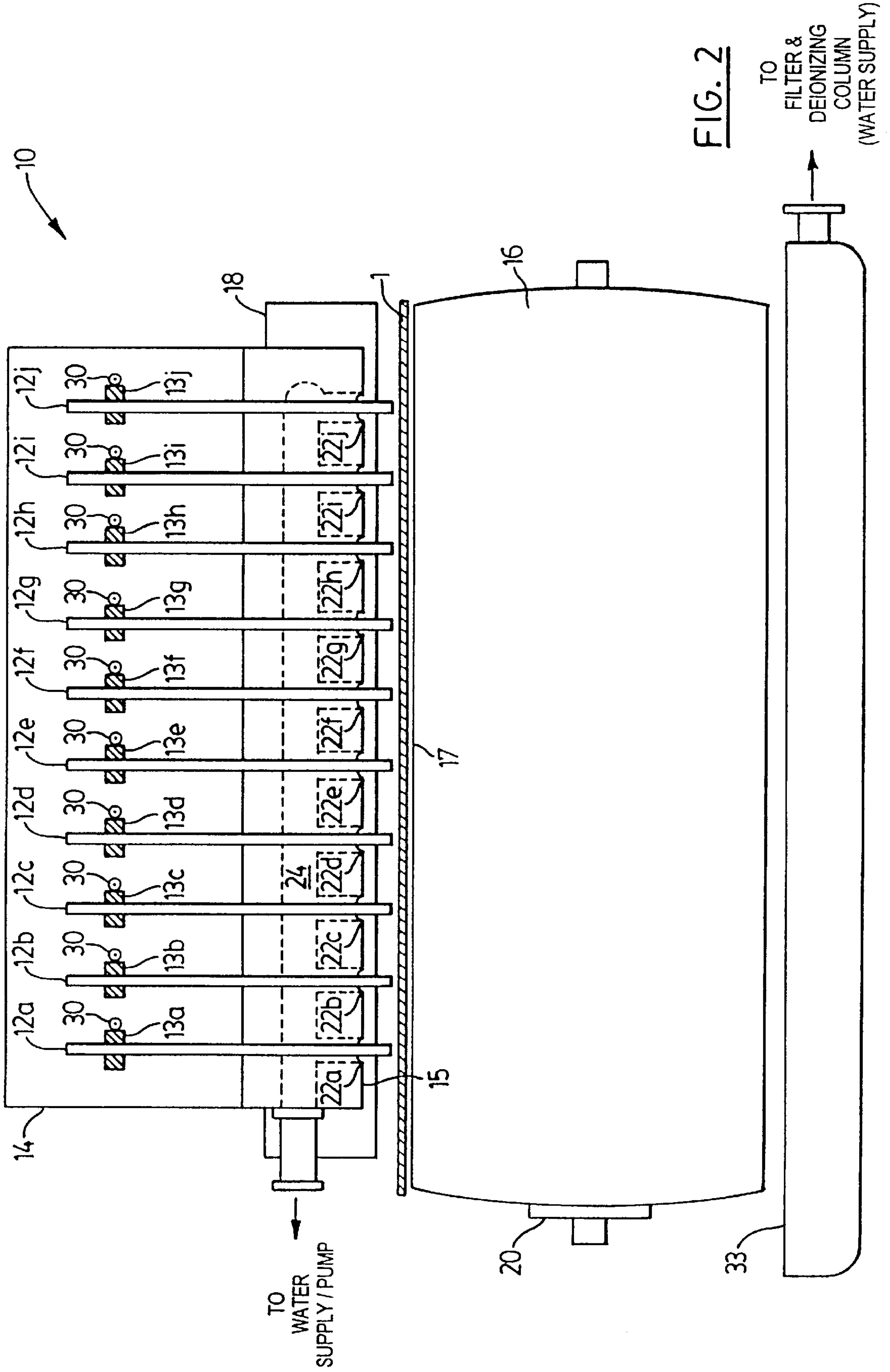
FIG. 2 is a sectional view of the apparatus of FIG. 1 taken at line A—A.

Reference is made to FIGS. 1 and 2, which show an apparatus 10 for perforating a synthetic plastic film 1 according to the present invention. In the drawings like reference numerals indicate like elements.

The perforation apparatus 10 comprises a series of rod electrodes 12 mounted in an electrode holder 14, and a return or roller electrode 16. The plastic film 1 to be perforated passes between the rod electrodes 12 and the return electrode 16. The rod electrodes 12 contact the top surface of the film 1 as the film 1 passes over the return electrode 16. Perforation is produced by applying a high voltage pulse with a rise time of less than one microsecond in a similar manner to that described in U.S. Pat. No. 4,777,338, which is herein incorporated by this reference.

As shown in FIG. 2, for a typical application the electrode holder 14 carries ten rod electrodes 12, shown individually as 12*a*, 12*b*, 12*c*, 12*d*, 12*e*, 12*f*, 12*g*, 12*h*, 12*i* and 12*j*. To prevent sparking between electrodes a minimum spacing of approximately 6 millimeters is required between adjacent electrodes 12. As shown in the drawings, the electrode holder 14 and electrodes are supported above the return electrode 16 by a support member or frame 18. The electrode holder 14 is supported above the return electrode 16 so that the lower surface 15 of the holder 14 is proximate to and parallel to the surface of the return electrode 16. A gap of 1.0 millimeter (mm) between the lower surface 15 of the electrode holder 14 and the return electrode 16 has been found to be suitable.

The electrodes 12 comprise a rod or wire made of a conducting material, typically a metal, although, it has been found that electrodes 12 formed from graphite are also suitable for the perforation apparatus 10. For electrodes 12 made of metal, tungsten is the preferred material as it not susceptible to electrical erosion and also exhibits very little corrosion when exposed to water. The use of small diameter rods (in the range of 0.2 mm) allows holes as small as 0.003 mm to be produced which are ideal for gas permeable types of plastic films. Each of the electrodes 12 includes a metal collar 13, shown individually as 13*a*, 13*b*, 13*c*, 13*d*, 13*e*, 13*f*, 13*g*, 13*h*, 13*i*, 12*j*, as shown in FIG. 2. Each metal collar 13 includes a high voltage lead 30 for making an electrical connection between the respective electrode 12 and an output on the high voltage power supply (not shown). Each electrode 12 is free to move within the metal collar 13 and electrical connection occurs through a gas spark between the collar 13 and the electrode 12 when a high voltage pulse is received from the high voltage power supply (not shown). Advantageously, the gas sparks have a pulse sharpening characteristic which has the effect of reducing the rise time of the pulse on the electrode and this assists in the perforation of the film 1. Furthermore, the electrodes 12 maintain the same contact area with the film 1 as they wear because the end of the constant diameter rod electrode 12 is making contact with the film 1. As a result, perforation is not changed as the rod electrodes 12 wear, and the short worn rod electrodes 12 are simply replaced with full length electrodes 12. In some applications, there will be a requirement that air (i.e. gas) sparks not be present and a free moving connection between the electrodes 12 and the input from the high voltage supply is made using a metal chain arrangement (e.g. a jeweller's chain) as will be familiar to one skilled in the art.

As depicted in FIG. 1, the return electrode 16 comprises a metal roller which is mounted below the rod electrodes 12. The return electrode 16 provides an electrical return path for the discharge from the point of each of the rod electrodes 12. The return electrode 16 also provides a surface 17 for supporting the film 1. Preferably, the return electrode 16 is made of a metal. While most metals will provide the required electrical conductivity, stainless steel is preferred because it provides good wear and corrosion resistance. Since the discharge sparks from the electrodes 12 pass through the return (roller) electrode 16, it is advisable to include a slip ring contact 20 to shunt the current resulting from the discharge spark and thereby bypass the bearings (not shown) in the roller electrode 16. Letting the return current pass directly through the roller electrode 16 will eventually damage the bearings and shorten their operating lifetime.

The electrode holder 14 is preferably made of an insulating material. Nylon, polyester and Delrin are all suitable for the electrode holder 14, but any electrical insulative material which is machinable is suitable. As also shown in FIG. 2, the electrode holder 14 includes a water jet outlet 22 for each of the electrodes 12, shown individually as 22*a*, 22*b*, 22*c*, 22*d*, 22*e*, 22*f*, 22*g*, 22*h*, 22*i*, 22*j*. The water jet outlets 22 are coupled to a water supply channel or manifold 24, which is coupled to a water supply or pump (not shown) through an inlet port 26. As will be described in more detail below, water is provided to the location of each electrode 12 to confine the electrical discharge to the film 1 between the electrodes 12 and the roller electrode 16. Without the water, the electrical discharges will spread over the surface of the film 1 and cause non-uniform perforations. To function properly, the water must have low conductivity, i.e. low level of contaminants or additives. Advantageously, the water jet arrangement according to the invention reduces the time needed to remove excess water from and dry the film 1 after perforation, which in turn facilitates high speed operation of the perforation apparatus 10.

In operation, the rod electrodes 12 are maintained in contact with the top surface of the film 1 through a very thin layer of water. The contact pressure must be sufficient to maintain a close contact between the ends of the electrodes 12 and the film 1. The contact pressure must not however be so high as to cause scratching of the surface of the film 1 or even tearing with thin or soft films 1. It has been found that a contact pressure in the range 500 to 1500 Pascals is suitable without causing scratching or tearing of most films. The weight of the rod electrode 12 mounted in the metal collar 13 is typically all that is required to produce the appropriate contact pressure. Perforation of the film 1 is produced by applying a high voltage pulse to each of the electrodes 12 as the film 1 is pulled (i.e. fed from a roll of film (not shown)) through the perforation apparatus 10. The high voltage pulse causes an electric discharge (i.e. spark) in the gap between the rod electrode 12 and the roller electrode 16 which burns a hole (i.e. perforation) in the immediately adjacent portion of the film 1. As described in U.S. Pat. No. 4,777,338, the high voltage pulse applied to the electrode 12 preferably has a rise time of less than one microsecond. Because the rod electrodes 12 are more efficient, lower magnitude high voltage pulses are sufficient to energize the electrodes 12 and cause discharges to perforate the film 1. To confine the electric discharge and thereby produce perforations having uniform diameters, a fine water spray is delivered by the respective jet 22 directly at the contact point formed between each rod electrode 12 and the roller electrode 16. Each jet 22 is supplied with water by the channel 24 or manifold. After passing around the contact points between the rod electrodes 12 and the roller electrode 16, the water falls to a collecting trough 33 (FIG. 2). In most applications, the water collected in the trough is reused and pumped through a filter (not shown) and a deionizing column (not shown), and then injected back into the water manifold 24 through the water pump (not shown). If the water supply and cost thereof is of no concern, then a total loss arrangement may be utilized in which the water is drained instead of being collected in the trough 33 and recycled. The total loss system facilitates providing a constant flow of water with low conductivity to the contact points of the rod electrodes 12 and the roller electrode 16 with no loss in the water quality.

The optimum diameter of the wire or rod used for the electrodes 12 is determined by the spacing of the perforated holes and the durability of the electrode material. For many applications, it has been found that electrodes 12 made from tungsten rods with a 1.0 millimeter diameter are suitable, i.e. holes with a spacing greater than 1.0 millimeter. If a hole spacing less than 1.0 mm is required, then thinner rods must be used for the electrodes 12 to enable separate perforations to be made at the closer spacing. For example, to produce perforations as close as 0.3 mm wire electrodes having a diameter of 0.2 mm are utilized. It will be appreciated that since the wire electrodes are mechanically weaker their use should be limited to applications where a hole spacing of less than 1.0 mm is needed. It will also be appreciated that the spacing of the spacing of the electrodes 12 in the holder 14 determines the spacing of the holes in the film 1 in the transverse axis while the speed at which the film 1 is pulled through the electrodes 12, 16 and the frequency at which the high voltage pulses are applied to the electrodes 12 determine the spacing of the holes in the longitudinal axis of the film 1.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for perforating a film, said apparatus comprising:

(a) one or more electrodes, said electrodes being mounted in an electrode holder and said electrodes being positioned to lightly contact the film to be perforated;

(a) a return electrode, said return electrode providing a support surface for the film;

(b) a water jet sprayer being mounted in said electrode holder, and providing a jet of water in the location said electrodes contact the film;

(c) said electrodes including an electrical coupler for coupling to a high voltage supply for energizing said electrodes to produce a discharge between said electrodes and said return electrodes to perforate said film.

2. The apparatus as claimed in claim 1, wherein said electrodes comprises rods formed from a conductive material.

3. The apparatus as claimed in claim 2, wherein said electrode holder includes means for allowing said electrodes to move in longitudinal direction.

4. The apparatus as claimed in claim 3, wherein said return electrode comprises a metal roller.

5. The apparatus as claimed in claim 3, wherein said electrodes are formed from tungsten.

6. The apparatus as claimed in claim 3, wherein said means for allowing said electrodes to move comprises a metal collar loosely coupled to the respective electrode, and said electrical coupler comprises a cable connected to said metal collar.

7. The apparatus as claimed in claim 3, wherein a minimum spacing is provided between said electrodes to prevent sparking between adjacent electrodes.

8. The apparatus as claimed in claim 6, wherein said electrodes have a diameter selected to provide a desired spacing between adjacent perforations.

9. A method for perforating a synthetic film, said method comprising the steps of:

(a) moving the film to be perforated through a gap defined by one or more rod electrodes and a roller electrode, said rod electrodes being in light contact with the film and the film being supported by said roller electrode;

(b) applying high voltage pulses to said rod electrodes to cause a discharge between said rod electrodes and said roller electrode sufficient to perforate the film in an area where each of said rod electrodes contacts the film;

(c) simultaneously applying a jet spray of water to the region of contact between each of said rod electrodes and the film.

10. The method as claimed in claim 8, wherein said rod electrodes are spaced sufficiently apart to prevent sparking between adjacent rod electrodes.

11. The method as claimed in claim 9, wherein said rod electrodes have a diameter selected to provide a desired spacing between adjacent perforations.

* * * * *